United States Patent
Rowley et al.

(10) Patent No.: US 8,990,842 B2
(45) Date of Patent: Mar. 24, 2015

(54) PRESENTING CONTENT AND AUGMENTING A BROADCAST

(75) Inventors: Marc W. Rowley, Westport, CT (US);
Lori M. Bistis, West Hartford, CT (US);
Jesse B. Pringle, Plantsville, CT (US);
Michael F. Gay, Collinsville, CT (US)

(73) Assignee: Disney Enterprises, Inc., Burbank, CA (US)

( * ) Notice: Subject to any disclaimer, the term of this patent is extended or adjusted under 35 U.S.C. 154(b) by 65 days.

(21) Appl. No.: 13/368,895

(22) Filed: Feb. 8, 2012

(65) Prior Publication Data
US 2012/0204202 A1  Aug. 9, 2012

Related U.S. Application Data

(60) Provisional application No. 61/440,675, filed on Feb. 8, 2011.

(51) Int. Cl.
*H04H 60/56* (2008.01)
*G06T 15/20* (2011.01)
*H04N 5/272* (2006.01)
*G06T 19/00* (2011.01)

(52) U.S. Cl.
CPC ............... *G06T 15/20* (2013.01); *H04N 5/272* (2013.01); *G06T 19/006* (2013.01)
USPC .............. 725/12; 725/10; 725/40; 382/118; 382/225

(58) Field of Classification Search
CPC . H04N 21/44222; H04N 5/272; H04H 60/45; G06K 9/6218; G06T 19/006; G06T 15/20
USPC ............................... 725/12, 10; 382/118, 225
See application file for complete search history.

(56) References Cited

U.S. PATENT DOCUMENTS

| | | | |
|---|---|---|---|
| 6,259,486 B1 * | 7/2001 | Mahvi | 348/553 |
| 6,287,199 B1 * | 9/2001 | McKeown et al. | 463/40 |
| 7,120,880 B1 * | 10/2006 | Dryer et al. | 715/863 |
| 7,246,081 B2 * | 7/2007 | Hill | 705/7.32 |
| 7,603,683 B2 * | 10/2009 | Reto | 725/34 |
| 7,730,507 B2 * | 6/2010 | Sakai et al. | 725/14 |
| 7,814,509 B2 * | 10/2010 | Kondo | 725/12 |
| 7,889,073 B2 * | 2/2011 | Zalewski | 340/539.25 |
| 8,190,907 B2 * | 5/2012 | Tu | 713/186 |
| 8,249,931 B2 * | 8/2012 | Giraud et al. | 705/14.4 |
| 8,504,843 B2 * | 8/2013 | Tu | 713/186 |

(Continued)

OTHER PUBLICATIONS

PRLog (Free Press Release), "*Control your PowerPoint and PDF presentations with Kinect*", Feb. 1, 2011, 2, pps., http://www.prlog.org/11120062-control-your-powerPoint-and-pdf-presentations-with-kinect . . . .

*Primary Examiner* — Nasser Goodarzi
*Assistant Examiner* — Michael B Pierorazio
(74) *Attorney, Agent, or Firm* — Fay Kaplun & Marcin, LLP (57) ABSTRACT

A method and system augments a broadcast by detecting an event that occurs while viewing a broadcast data by at least one user; when the event is detected, automatically capturing feedback data with a human computer interaction (HCI) capturing device (HCICD) from the at least one user, the feedback data being indicative of a measurement of the user from viewing the event; generating a feature data as a function of the feedback data; including the feature data in the broadcast data to generate an augmented broadcast data; and transmitting the augmented broadcast data.

18 Claims, 3 Drawing Sheets

(56) References Cited

U.S. PATENT DOCUMENTS

| | | | |
|---|---|---|---|
| 8,689,250 B2* | 4/2014 | Bhide et al. | 725/28 |
| 8,712,110 B2* | 4/2014 | Eckhoff et al. | 382/118 |
| 8,819,738 B2* | 8/2014 | Gresta | 725/61 |
| 2003/0063222 A1* | 4/2003 | Creed et al. | 348/687 |
| 2005/0091680 A1* | 4/2005 | Kondo | 725/12 |
| 2005/0262542 A1* | 11/2005 | DeWeese et al. | 725/106 |
| 2006/0143647 A1* | 6/2006 | Bill | 725/10 |
| 2006/0177109 A1* | 8/2006 | Storch | 382/118 |
| 2007/0110298 A1* | 5/2007 | Graepel et al. | 382/154 |
| 2007/0150916 A1* | 6/2007 | Begole et al. | 725/10 |
| 2007/0152994 A1* | 7/2007 | Koh | 345/211 |
| 2007/0203911 A1* | 8/2007 | Chiu | 707/10 |
| 2008/0169930 A1* | 7/2008 | Mallinson | 340/573.1 |
| 2009/0158309 A1* | 6/2009 | Moon et al. | 725/12 |
| 2009/0158374 A1* | 6/2009 | Malaure et al. | 725/114 |
| 2009/0164917 A1* | 6/2009 | Kelly | 715/757 |
| 2009/0195392 A1* | 8/2009 | Zalewski | 340/573.1 |
| 2010/0008547 A1* | 1/2010 | Yagnik et al. | 382/118 |
| 2010/0075749 A1* | 3/2010 | Seshadri | 463/29 |
| 2010/0197399 A1 | 8/2010 | Geiss | |
| 2010/0245349 A1 | 9/2010 | Gay et al. | |
| 2010/0247060 A1 | 9/2010 | Gay et al. | |
| 2010/0299210 A1* | 11/2010 | Giraud et al. | 705/14.66 |
| 2010/0304853 A1* | 12/2010 | Kukita | 463/30 |
| 2010/0321389 A1 | 12/2010 | Gay et al. | |
| 2011/0018875 A1* | 1/2011 | Arahari et al. | 345/420 |
| 2011/0065490 A1* | 3/2011 | Lutnick | 463/16 |
| 2011/0275432 A1* | 11/2011 | Lutnick et al. | 463/25 |
| 2012/0059845 A1* | 3/2012 | Covell et al. | 707/769 |
| 2012/0135799 A1* | 5/2012 | Okada et al. | 463/25 |
| 2012/0218266 A1* | 8/2012 | Maeta et al. | 345/422 |
| 2012/0244939 A1* | 9/2012 | Braun | 463/31 |
| 2012/0262574 A1* | 10/2012 | Park et al. | 348/143 |
| 2013/0111509 A1* | 5/2013 | Guo et al. | 725/12 |
| 2013/0312041 A1* | 11/2013 | Gresta | 725/61 |

\* cited by examiner

PRESENTING CONTENT AND AUGMENTING A BROADCAST

PRIORITY CLAIM

This invention claims priority to U.S. Provisional Patent Application Ser. No. 61/440,675 entitled "Interaction with Content Through Human Computer Interface", filed Feb. 8, 2011, the disclosure of which is incorporated, in its entirety, herein.

FIELD OF THE INVENTION

This present invention pertains to the field of presenting content and augmenting a broadcast. The exemplary embodiments relate to a method and system for providing and augmenting a broadcast based on data from a viewer.

BACKGROUND INFORMATION

A media broadcast may be sent to a variety of electronic devices. For example, a broadcast may be viewed on a television, a computer, a mobile device, etc. The broadcast may also be sent live such as a sporting event coverage, with audio or video, be sent pre-recorded, or with a brief broadcast delay. During a broadcast, a broadcasting device may include data to be shown concurrently with the broadcast. For example, broadcasting devices may include advertisements in a non-intrusive area during the broadcast.

A broadcasting device may also show data that is based upon viewer feedback. Conventional broadcasting devices may include poll data. For example, during a broadcast for a sporting event, a question may be posed such as "Who should be the MVP for this game?" with a number of choices listed beneath. Viewers of the broadcast may cast a vote (e.g., phone, website, etc.) and after a predetermined period, the results of the poll may be displayed during the broadcast. However, for such viewer feedback data to be collected and shown during a broadcast, the viewer is often required to provide the data to the broadcasting device.

Recent advances in sensor technology and computer vision methods open the door to a new trend in human computer interaction (HCI) that is more natural and entertaining. A HCI device capable of translating human gestures, movements, voice, and facial expression into a set of commands that, in turn, can control a computer application, is highly attractive because it supports human behavior-like interactions. A user engagement and visualization, where user reality and virtual reality are mixed, allows for user intuitive and intelligent interaction with virtual content and for seamless visualization of real and virtual content in a video presentation.

Motion capture is the field of recording motion of a person, animal, or object and translating the captured data representing the movement into meta-data, specifically mathematical models of the captured object's movement and its appearance. Practical applications of motion capture technology have been used in the fields of movie making, animation, video games (both game animation/production and for playing the games), military applications, medicine, and sports and entertainment. Motion capture systems can be used to capture motion and positional data in two or three dimensions. "Motion capture" as used in this application includes the capture and use of objects' positional data and appearance models. The positional data and appearance models may be continuous-time estimates based on discrete data samples. The positional data and appearance models may be derived from sources such as one or more video image sequences of a scene, range image data, depth images, and acoustical data. Objects' appearance models may include 3D surface, pose, color, and texture models.

Motion capture systems typically involve a data capture device, a data translating and processing system, and a data output device. Data capture devices used with motion capture systems include cameras, infrared sensors, microphones, and other recorders and detectors. Mechanical, magnetic, and RF positioning motion capture systems may also be used to provide motion capture data. Data translating and processing systems are typically computer systems, including systems from sophisticated movie animation graphics computers to home computers and video game consoles. Data output devices include computer video monitors, televisions, movie screens, robotics, and other devices that have been controlled or manipulated using captured motion data.

Motion capture data is often mapped to a model. A model in computer-vision is a mathematical or graphical representation that characterizes the data. For example, a B-spline model may be used to represent a captured object's surface, a topological-graph may be used to represent a captured object's gesture (pose), or a color histogram may be used to represent the captured object's appearance. An object's model, as a characteristic representation, is used to detect, identify, and track an object's movements and gestures in the scene. Motion capture technology can be used to create "virtual reality" systems where users interact with digital (virtual) content, such as in simulators and other training environments, virtual walk-throughs, and virtual interaction between performers and digital content. Another application for motion capture technology is "augmented reality" where in a video presentation virtual elements (e.g. graphical signs or players) are placed relative to real elements (e.g. studio or sports arena) so their appearance is consistent with the camera movements.

DETAILED DESCRIPTION

The present invention relates to a method and system for presenting content and augmenting a media broadcast by detecting an event that occurs while viewing a broadcast data by at least one user; when the event is detected, automatically capturing feedback data with a human computer interaction (HCI) capturing device from the at least one user, the feedback data being indicative of a measurement of the user from viewing the event; generating a feature data as a function of the feedback data; including the feature data in the broadcast data to generate an augmented broadcast data; and transmitting the augmented broadcast data.

The exemplary embodiments may be further understood with reference to the following description of the exemplary embodiments and the related appended drawings, wherein like elements are provided with the same reference numerals. The exemplary embodiments are related to systems and methods for providing content and augmenting a media broadcast. Specifically, a broadcast may be augmented by including a feature within the broadcast as a function of viewer feedback data. The feedback data may be received automatically, thereby not requiring a viewer to manually provide feedback data to the broadcasting device. Furthermore, the feedback data may be measured using a transparent mode of operation in which the viewer is not solicited.

Initially, it is noted that the terminology used herein for the exemplary embodiments of the present invention may include different terms to refer to common elements. For example, a "viewer" and a "user" may relate to a common entity or person and is used herein interchangeably. In another example, a broadcasting device may represent a broadcaster and is used herein interchangeably.

Figure 1:
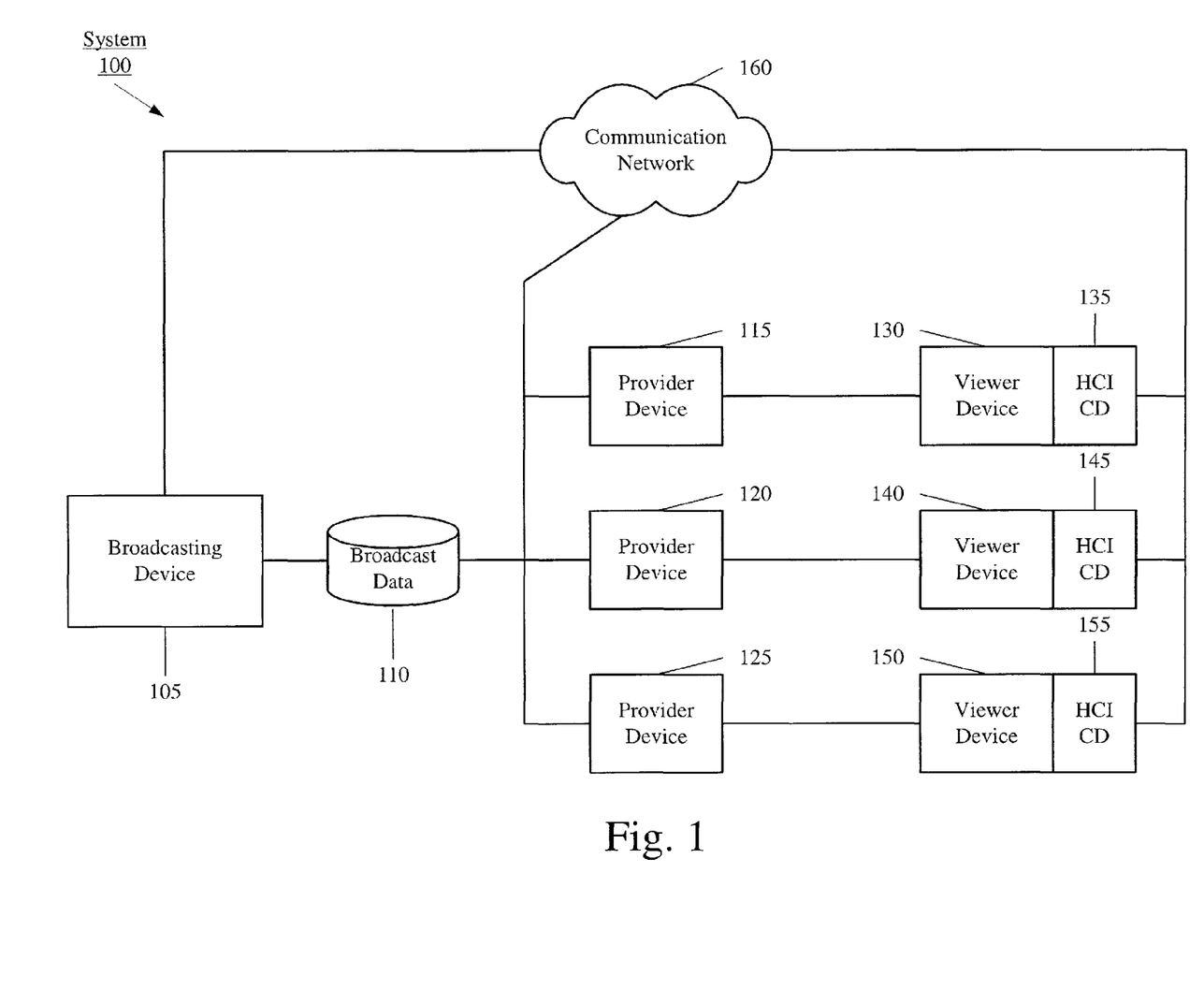
FIG. 1 shows a system for augmenting a broadcast according to an exemplary embodiment of the present invention.

FIG. 1 shows a system 100 for augmenting a broadcast data according to an exemplary embodiment of the present invention. The system 100 may be configured to transmit a broadcast data to a plurality of devices. As illustrated, a broadcasting device 105 may transmit broadcast data 110 to provider devices 115, 120, 125 which in turn forward the broadcast data to viewer devices 130, 140, 150, respectively. It should be noted that the provider devices 115, 120, 125 may respectively format the broadcast data prior to forwarding to the viewer devices 130, 140, 150, respectively. The viewer devices 130, 140, 150 may further include a human computer interaction (HCI) capturing device (HCICD) 135, 145, 155, respectively. The broadcasting device 105, the broadcast data 110, the provider devices 115, 120, 125, the viewer devices 130, 140, 150, and the HCICD 135, 145, 155 will be described in further detail below.

Figure 2:
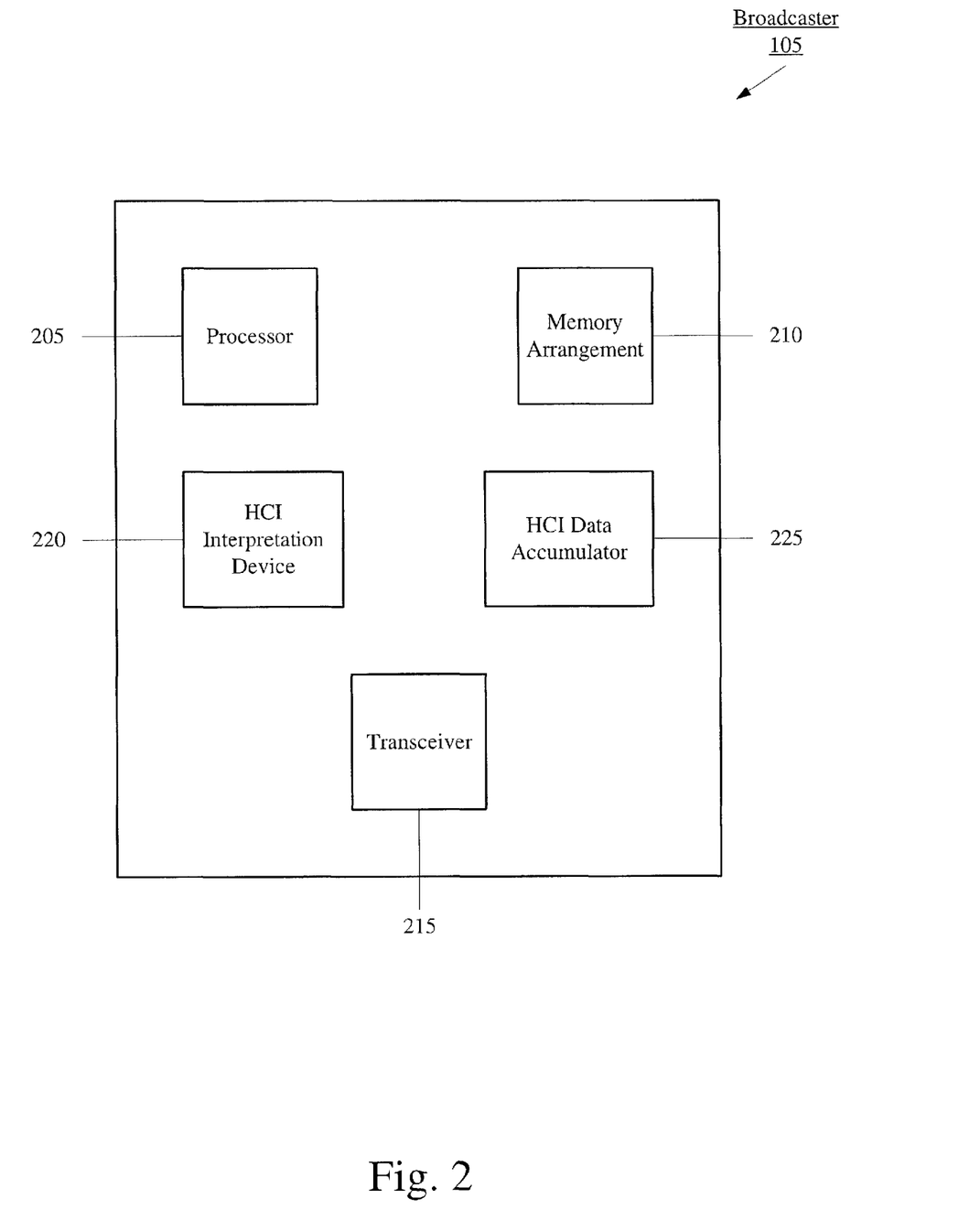
FIG. 2 shows a broadcasting device of FIG. 1 according to an exemplary embodiment of the present invention.

The broadcasting device 105 may be a source for the broadcast data 110. Specifically, the broadcasting device 105 may be device for a broadcaster that transmits the broadcast data 110 to the provider devices 115, 120, 125. As illustrated in FIG. 2, the broadcasting device 105 may include a processor 205, a memory arrangement 210, a transceiver 215, a HCI interpretation device (HCIID) 220, and a HCI data accumulator (HCIDA) 225. As will be described in further detail below, the broadcasting device 105 may receive a plurality of HCI data from a plurality of HCICD 135, 145, 155 and interpret the HCI data to generate the feature to be included in the broadcast data 110. It should be noted that the exemplary embodiments of the present invention may further be configured for the feature to be generated by the provider devices 115, 120, 125 based upon HCI data received by the HCICD 135, 145, 155, respectively. It should also be noted that the broadcasting device 105 may also be configured to transmit a plurality of broadcast data 110 to the provider devices 115, 120, 125.

The provider devices 115, 120, 125 may be devices for any entity that receives the broadcast data 110 to re-transmit the broadcast data 110 to viewer devices. For example, the provider device 115 may be for a cable provider, the provider device 120 may be for a satellite provider, and the provider device 125 may be for a cellular network provider. Accordingly, the viewer device 130 may be a television set configured to receive a cable transmission, the viewer device 140 may be a television set configured to receive a satellite transmission, and the viewer device 150 may be a cellular phone configured to receive a cellular transmission. As discussed above, the provider devices 115, 120, 125 may format the broadcast data 110 from the broadcasting device 105 so that the respective viewer devices are configured to properly display the broadcast data 110. It should be noted that the provider devices and the viewer devices are only exemplary. The exemplary embodiments of the present invention may be configured to augment broadcast data so that any provider device that receives the broadcast data 110 is capable of providing the augmented broadcast data to any respective viewer device. For example, a further provider device may be for a data network provider for a further viewer device such as a personal digital assistant that is configured to communicate therewith. Further viewer devices may include computers, smart phones, tablets, laptops, movie projectors/screens, etc. It should also be noted that the use of the provider devices 115, 120, 125 is only exemplary. In another exemplary embodiment, the viewer devices 130, 140, and/or 150 may be configured to directly receive the broadcast data 110 from the broadcasting device 105.

It should be noted that the broadcasting device 105 including the variety of above described components or the provider devices 115, 120, 125 being a singular unit is only exemplary. According to another exemplary embodiment, the broadcasting device 105 or the provider devices 115, 120, 125 may each be embodied as a system that includes a variety of different computing devices configured to generate the feature. For example, the components described for the broadcasting device 105 may be embodied in separate components. In another example, the broadcasting device 105 or the provider devices 115, 120, 125 may represent a system including a variety of other devices conventionally used in airing or forwarding the broadcast data 110.

The HCICD 135, 145, 155 may be any electronic component configured to receive HCI data. It should be noted that the HCICD 135, 145, 155 may be an incorporated component of the viewer devices 130, 140, 150 or may be a separate component. It should also be noted that the viewer devices 130, 140, 150 each including the HCICD 135, 145, 155, respectively, is only exemplary. In another exemplary embodiment of the present invention, select viewer devices may not include a HCICD.

The HCICD may receive a plurality of different types of HCI data. In a conventional use, the HCICD may track a location of a user (e.g., a show host) and thereby control an appearance of the user's environment (e.g., a television studio). The control of the appearance may relate to aspects such as lighting and highlighting various virtual elements distributed at different locations in the studio. The HCICD may serve to make elements such as lighting more dynamic or reduce a staff required to produce a show by automating processes such as lighting changes. The HCICD may be configured so that the user's gestures and voice may trigger a virtual playbook action that is predetermined such as selecting teams based on factors such as BCS rankings, Bracket, or Playoff picks when in the context of a sports show. The exemplary embodiments of the present invention are further configured to receive HCI data from other users (e.g., non-home viewers) such as show hosts and incorporate this HCI data in the generation of the feature to be included in the broadcast data 110.

According to the exemplary embodiments of the present invention, the HCI 135, 145, 155 may provide a further functionality. Specifically, the HCI 135, 145, 155 may provide data which includes a new type of feedback from viewers of the broadcast data 110 to the broadcasting device 105. The feedback data may be a behavioral reaction of the viewers in response to various moments within the broadcast. For example, in a live sports game broadcast, the feedback data may be reactions from the viewers at a critical free throw moment, a field goal attempt, etc. In another example, in another type of broadcast, the feedback data may be measurements related to viewers to a well performed song such as in a reality show broadcast or a halftime show. The reactions generated by the viewers or the measurements related to the viewers may be captured by the HCICD 135, 145, 155 and transmitted to the broadcasting device 105. The viewer responses captured by the HCICD 135, 145, 155 may include, for example, clapping motions, jumping motions, facial expressions, audio data, temperature data, etc. As will be described in further detail below, the HCI data captured by the HCICD 135, 145, 155 may be interpreted so that the broadcast data 110 may be augmented such as in including a feature in the broadcast data 110.

The broadcast data 110 may be a variety of different types such as a sporting event, concert, contest, scripted performances, etc. The broadcast data 110 may include video data or audio data that is distributed to the provider devices 115, 120, 125 via a variety of different mediums such as television air waves, the Internet, a cable television distribution network, a satellite distribution signal, a cellular network, or other mechanism of broadcast. The viewer devices 130, 140, 150 may receive the broadcast data 110 and display the broadcast data 110 for the viewer. As described above, the HCICD 135, 145, 155 may receive HCI data. The HCI data may be received using a variety of different components such as motion capture devices, microphone array, cameras, etc. The HCI data received by the HCICD 135, 145, 155 may capture human input and convert the input into the HCI data regardless of whether the input includes motion, sound, position, heat, light, or a combination thereof.

According to the exemplary embodiments of the present invention, while a viewer is watching the broadcast data 110 on one of the viewer devices 130, 140, 150, the respective HCICD 135, 145, 155 may capture measurements from the viewer such as motion, sound, position, video, or other feedback data in response to an event and convert the viewer feedback data into, for example, raw HCI data. The HCI data may be forwarded via a communication network 160 to the broadcasting device 105 or through the provider devices 115, 120, 125.

The event during the broadcast data 110 may include a variety of different types. In a first example, the event may be predetermined. For example, during a pre-recorded broadcast, the component configured to generate the feature may determine at which points during the broadcast an event is to occur. In a second example, the event may be determined as a function of criteria that indicates an event occurs. For example, during a live broadcast such as a football game, (1) when points are scored, an event may be indicated; (2) when a gain of yardage beyond a predetermined amount is gained, an event may be indicated; (3) when a first down is made, an event may be indicated; etc. In a third example, the event may be determined as a function of measurements from the viewer. For example, during a broadcast, when the viewer generates a reaction or the HCICD 135, 145, 155 receives feedback data from the viewer, the event may be indicated without any predetermined factors considered.

As discussed above, the event may be predetermined or may naturally occur during the broadcast. When predetermined, the component generating the feature (e.g., broadcasting device 105, provider devices 115, 120, 125, viewer devices 130, 140 150) may include criteria that satisfies a condition that an event occurs or may be selected by a user of the feature generating component. When naturally occurring, the event may also be determined from a set of criteria. The event may also be determined from measurements gathered from the viewer (e.g., feedback data). For example, the measurements may be unrelated to the broadcast such as a random feature being included indicative of a percentage of fans viewing a sports broadcast for the teams playing.

As described above, the broadcasting device 105 may include a transceiver 215 to receive the HCI data. The HCI data from the viewer may be collected in the HCIDA 225. In the exemplary embodiment where the broadcasting device 105 is configured to transmit a plurality of broadcast data 110, the HCIDA 225 may also collect the HCI data from the viewer and separate the HCI data for a particular broadcast. For example, when the HCI data is forwarded from the HCICD 135, 145, 155, a tag or header may be included in the data stream to indicate which broadcast the HCI data pertains. The broadcasting device 105 may further include the HCIID 220 that processes (e.g., aggregate, select, filter, etc.) the collected HCI data from the HCIDA 225. The HCIID 220 may be triggered after a predetermined time period after one of the events in the broadcast data 110 occurs. The HCIID 220 may output data that is used as a basis for the feature to be included in the broadcast data 110. Specifically, the feature may be distributed back to the viewer through the transceiver 215 to the viewer devices 130, 140, 150 via the same transmission mechanism by which the viewer receives the broadcast data 110 previously. It should be noted that the feature may also be distributed to the viewer by alternate mechanisms. For example, a viewer may be watching a broadcast on a television set via a cable network but receive the feature on a different viewer device such as a cellular phone.

It should be noted that the HCIID 220 being a separate unit is only exemplary. In another exemplary embodiment, the HCIID 220 may be a functionality of the processor 205. It should also be noted that the HCIDA 225 being a separate unit is only exemplary. In another exemplary embodiment, the HCIDA 225 may be a portion of the memory arrangement 210.

It should also be noted that the communication network 160 being used as a means to forward the HCI data from the HCICD 135, 145, 155 to the broadcasting device 105 is only exemplary. In another exemplary embodiment, the HCICD 135, 145, 155 may be configured with a direct connection to the broadcasting device 105. It should also be noted that the broadcast data 110 from the broadcasting device 105 may be forwarded to the communication network 160. Thus, for example, when the communication network 160 is the Internet, electronic devices that have an active connection thereto is capable of receiving and displaying the broadcast data 110.

According to the exemplary embodiments of the present invention and with reference to the above system 100 of FIG. 1 and the broadcasting device 105 of FIG. 2, the augmentation of the broadcast data 110 will be described in a specific example. The broadcasting device 105 may transmit the broadcast data 110 such as a sporting event. The provider devices 115, 120, 125 may receive the broadcast data 110 and forward the broadcast data 110 to the viewer devices 130, 140, 150. The viewer may then watch the broadcast data 110. While viewing the sporting event, the viewer may activate the HCICD 135, 145, 155. The activation of the HCICD 135, 145, 155 may grant the broadcasting device 105 permission to obtain feedback data as HCI data. The HCI data may be for the viewer only or may also be for any participant viewing the broadcast data 110 at the location in which the HCICD 135, 145, 155 is activated. The permission to forward the HCI data to the broadcasting device 105 may be obtained in a variety of ways. In a first example, the permission may be obtained in advance by the user/viewer selecting an option in a user interface of the HCICD 135, 145, 155. The setting may be chosen to transmit the HCI data, for example, when the viewer creates an account with the broadcaster or a third party (e.g., the provider). In another example, the broadcasting device 105 or third party (e.g., the provider device) may send a query message to the viewer asking the viewer to grant permission to obtain the HCI data from the viewer. In this example, the query may be sent each time the HCICD 135, 145, 155 is activated, when the broadcast data 110 may potentially include events in which the broadcast data 110 may be augmented, whenever the broadcast data 110 is tuned in by the viewer, etc. The permission response may be authenticated using conventional methods such as a password protection or device serial number identification. The permission response may be logged such as in the memory arrangement 210 of the broadcasting device 105 and stored for retrieval in the event of a dispute or may also be sent to another party (e.g., the provider device). The HCI data transmission may also include an "opt-out" option where the viewer specifically denies such permission.

When the HCICD 135, 145, 155 captures feedback data such as motion when the viewer claps or jumps as well as sound data (e.g., cheering, booing, etc.) during a moment in the broadcast, the HCICD 135, 145, 155 may translate the feedback data into the HCI data which may be metadata representing the motion, sound, etc. The HCI data may be sent as raw data to the broadcasting device 105 without any significant processing so that the HCIID 220 of the broadcasting device 105 processes the HCI data. It should be noted that the broadcasting device 105 including the HCIID 220 is only exemplary. In another exemplary embodiment of the present invention, the HCIID 135, 145, 155 may be configured to process the HCI data (e.g., include an individual HCIID) and transmit processed data to the broadcasting device 105, thereby negating the need for the HCIID 220 in the broadcasting device 105.

Whether the HCI data is processed by the HCIID 220 or by the HCICD 135, 145, 155, the HCI data may be processed using a variety of means. In a first example, the HCI data may be filtered such as removing or flagging inappropriate language or obscene gestures from motion data that is a part of the HCI data. The filter may be applied for a variety of other factors such as selecting only data where there is a minimum number of people in the location where the HCICD 135, 145, 155 is located, only from a certain region of the country, only from a viewer whose viewer device is tuned to the relevant event, etc. The HCI data may be minimally processed (e.g., raw video data of selected viewers cheering may be chosen with no processing thereto) or may be significantly processed (e.g., using the data as a basis to generate a new feature).

The augmentation of the broadcast data 110 may be performed in a variety of different manners. As discussed above, the HCI data may be minimally processed. In such a case, according to the exemplary embodiments of the present invention, the broadcast data 110 may be augmented by including a window (e.g., in a non-intrusive area) that shows video or plays sound of the viewer feedback. When the HCI data is significantly processed, a map display may be shown where the feature includes a graphical view of percentages of viewers having a particular opinion (e.g., pie chart, bar graph, etc.). In the exemplary embodiments of the present invention described above, the HCI data may be collected by the HCIDA 225 so that the feature included in the broadcast data 110 may be representative of a plurality of viewers.

In another exemplary embodiment of the present invention with respect to augmenting the broadcast data 110, the feedback data may be used to control an appearance of an avatar representing the viewer so that the avatar mimics the viewer's motions, sounds, etc. The avatar may be displayed to appear in the audience of the event (e.g., either among real attendees or in an audience of avatars) or may appear to the viewer displayed on the field (e.g., imitating an athlete or performer). In this exemplary embodiment, the HCI data may be used on an ad hoc basis to represent only the viewer.

As discussed above, the HCICD 135, 145, 155 may be configured to measure a gesture or voice of the viewer while reacting to a broadcast (e.g., show, sporting event, etc.). The measured gestures/voices may be processed by the HCICD 135, 145, 155 and/or the HCIID 220 using various known recognition algorithms. The recognition algorithms may be designed to translate the measured raw HCI data into processed data. For example, an audio signal data may be translated into recognized key words, a gesture data may be translated to recognized reactions of agreement or disagreement, or a video image data may be translated to an estimate of a number of viewers in the scene. In another example, a general opinion data may be determined from the HCI data captured by the HCICD 135, 145, 155. This information may be processed so that the broadcast data 110 may be augmented.

It should be noted that the above described exemplary embodiments is only exemplary. According to another exemplary embodiment of the present invention and as mentioned above, the processing of the HCI data may be performed at the broadcasting device 105, the provider devices 115, 120, 125, or the viewer devices 130, 140, 150 as a function of the type of feature to be included in the broadcast data 110. For example, when the feature is a graphical representation generated from a plurality of opinions of the viewers, the broadcast device 105 may gather the HCI data to generate the feature. In another example, when the feature is based upon regional data (e.g., opinions of viewers in a localized area), the provider devices 115, 120, 125 may generate the feature. In yet another example, when the feature is based upon a particular viewer, the viewer devices 130, 140, 150 may generate the feature.

It should also be noted that the processing of the HCI data by either the HCIID 220 or the HCICD 135, 145, 155 is only exemplary. According to the exemplary embodiments of the present invention, the HCI data may be processed at least partially by multiple components of the system 100. In a first example, the HCI data may be initially processed by the HCIID 220 to generate a part of the feedback data. The part of the feedback data may be forwarded to the provider devices 115, 120, 125 that may further process the feedback data. At the provider devices 115, 120, 125, the processing may entail, for example, considering factors such as region, age, etc. The further processed feedback data may then be forwarded to the viewer devices 130, 140, 150 which may finalize the processing. At the viewer devices 130, 140, 150, the processing may entail, for example, tailoring the feature specifically for the viewer. Thus, the processing of the HCI data may occur at least partially along the way at different components of the system 100 so that the feature to be included in the broadcast data 110 may be tailored according to any variety of factors.

Figure 3:
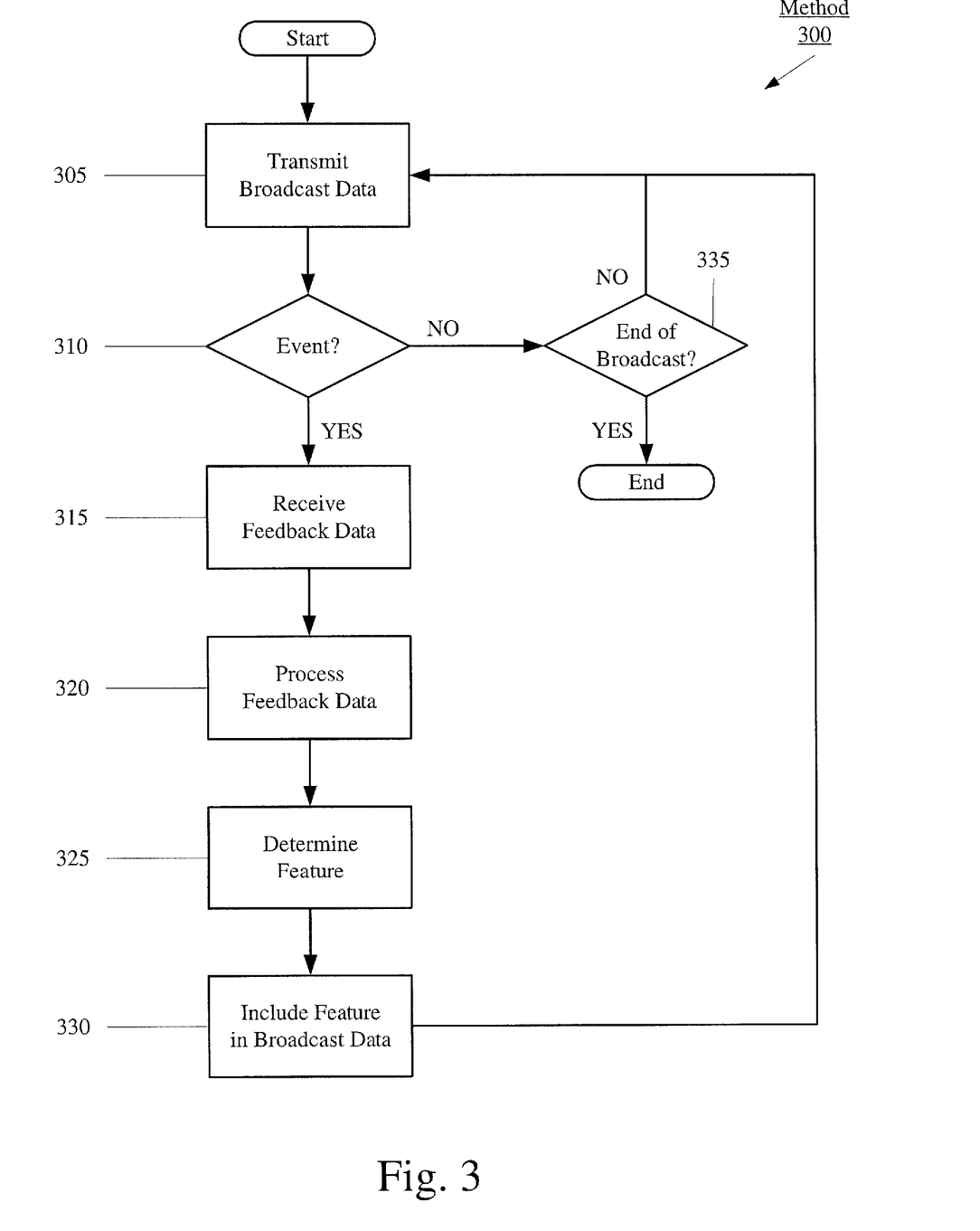
FIG. 3 shows a method for augmenting a broadcast according to an exemplary embodiment of the present invention.

FIG. 3 shows a method 300 for augmenting a media broadcast according to an exemplary embodiment of the present invention. The method 300 relates to augmenting a broadcast data by including a feature within the broadcast data as a function of feedback data in the form of HCI data. The method 300 will be described with reference to the system 100 of FIG. 1 and the broadcasting device 105 of FIG. 2.

In step 305, the broadcast data 110 is transmitted from the broadcasting device 105. As discussed above, the broadcasting device 105 may include a transceiver 215 configured to transmit the broadcast data 110. The broadcasting device 105 may also transmit the broadcast data 110 to a plurality of provider devices 115, 120, 125 which forwards the broadcast data 110 to respective viewer devices configured accordingly such as the viewer devices 130, 140, 150, respectively. Thus, a user may view the broadcast on the viewer devices 130, 140, 150.

In step 310, a determination is made whether an event occurs during the broadcast. For example, for a pre-recorded media broadcast, the events may be predetermined to occur at specific times during the broadcast. In another example, for a live media broadcast, the events may be determined dynamically as the broadcast runs so that when predetermined criteria are met, an event may be ascertained or when the broadcasting device 105 (e.g., administrator) manually selects an event. In a further example, during a broadcast, the events may be determined as a function of feedback data that is received by the HCICD 135, 145, 155. In yet another example, the event may be randomly generated independent of the broadcast.

If the determination in step 310 indicates that an event occurs, the method 300 continues to step 315. In step 315, feedback data is received by the broadcasting device 105. As discussed above, the viewers may have the HCICD 135, 145, 155 which may be stand alone devices or connected and/or incorporated with the viewer devices 130, 140, 150, respectively. The HCICD 135, 145, 155 may capture feedback data and translate the feedback data into HCI data. Also as discussed above, the HCICD 135, 145, 155 may capture a variety of different types of feedback including, for example, motion, video, audio, temperature, etc. The broadcasting device 105 may receive the HCI data when the HCICD 135, 145, 155 transmit the HCI data therefrom, through the communication network 160, to the broadcasting device 105 via the transceiver 215.

In step 320, the broadcasting device 105 processes the HCI data. As discussed above, the HCI data may be processed minimally or may be significantly processed as a function of the type of feature to be incorporated into the broadcast. It should again be noted that the processing of the HCI data may also be performed at the provider devices 115, 120, 125 or the viewer devices 130, 140, 150.

In step 325, a determination is made as to the type of feature to be used. For example, if only a single user's feedback is used for the broadcast augmentation, then the feature may be a replay of the reaction to the event that was captured by the HCICD. In another example when only a single user's feedback is used, the HCI data may be processed to determine how to display an avatar representative of the viewer is to be shown. In yet another example, if feedback from a plurality of users is used for the broadcast augmentation, then the feature may be a graphical display of a poll, a chart, a graph, etc. or may include a replay of select viewers of the broadcast. Thus, in step 325, the broadcasting device 105 includes the feature into the broadcast data 110, thereby generating an augmented broadcast data. When the method 300 returns to step 305, the augmented broadcast data 110 is transmitted.

It should again be noted that the above step 320 being described in which the broadcasting device 105 processes the HCI data is only exemplary. As discussed above, the HCI data may be processed by the HCICD 135, 145, 155 when these devices include the HCIID.

Returning to step 310, if the determination is made that no event has occurred, then the method continues to step 335. In step 335, a determination is made whether the broadcast has ended. If the broadcast has ended, then the method 300 ends. If the broadcast has not ended, then the method 300 returns to step 305 where the broadcast 110 continues to be broadcast with no augmentation.

The exemplary embodiments of the present invention provide content to viewers and are configured to augment a broadcast as a function of automatically receiving viewer feedback. Upon transmitting a broadcast to a plurality of viewer devices, when the viewer grants permission for the broadcasting device to receive feedback data, HCICD capture the feedback and transmit the feedback data to the broadcasting device. Upon processing the feedback data, a feature may be generated that is included in the broadcast data to further generate an augmented broadcast data which is transmitted to the viewer devices. In such a manner, the HCICD captures the feedback and the method is capable of automatically augmenting the broadcast data.

Those skilled in the art will understand that the above-described exemplary embodiments may be implemented in any number of manners, including, as a separate software module, as a combination of hardware and software, etc. For example, the HCI data may interpreted by a program containing lines of code that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method, comprising:
    detecting an event that occurs within broadcast data while a plurality of users is viewing the broadcast data;
    when the event is detected, automatically capturing user feedback data with a human computer interaction (HCI) capturing device (HCICD) from each of the users, the user feedback data for each of the users being indicative of measurement data for each of the users from viewing the event;
    aggregating the measurement data indicated by the user feedback data from each of the users;
    generating a feature as a function of the aggregated measurement data;
    including the feature in the broadcast data to generate an augmented broadcast data; and
    transmitting the augmented broadcast data.

2. The method of claim 1, wherein the broadcast data is one of a live broadcast, a live broadcast with a delay, and a prerecorded broadcast.

3. The method of claim 1, wherein the user feedback data is selected from a group consisting of image data, audio data, video data, position data, temporal data, heat data, light data, and a combination thereof.

4. The method of claim 1, wherein the feature includes at least one of graphics, an animation, and a captured video.

5. The method of claim 1, wherein the event is one of predetermined, determined as a function of preset criteria, naturally occurring in the broadcast data, and generated as a function of the feedback data.

6. The method of claim 1, wherein the measurement data is based on one of a facial recognition, a motion recognition, and an audio recognition.

7. The method of claim 1, further comprising:
    transmitting the broadcast data to a plurality of provider devices; and
    forwarding the broadcast data from each of the provider devices to respective viewer devices.

8. The method of claim 1, wherein the HCICD captures the user feedback data at a location of each of the users.

9. The method of claim 1, further comprising:
    receiving data indicating a grant of permission to capture the user feedback data.

10. A system, comprising:
    a broadcasting device transmitting broadcast data, the broadcast data including at least one event;
    a human computer interaction capturing device(HCICD) configured to automatically capture user feedback data from a plurality of users when the event within the broadcast data is detected by the broadcasting device while the plurality of users is viewing the broadcast data, the user feedback data for each of the users being indicative of measurement data for each of the users from viewing the event; and a data aggregator aggregating the measurement data indicated by the user feedback data from each of the users, wherein the broadcasting device is configured to generate a feature as a function of the aggregated measurement data, to include the feature in the broadcast data to generate an augmented broadcast data, and to transmit the augmented broadcast data.

11. The system of claim 10, wherein the user feedback data is selected from a group consisting of image data, audio data, video data, position data, heat data, light data, and a combination thereof.

12. The system of claim 10, wherein the feature includes at least one of graphics, an animation, and a captured video.

13. The system of claim 10, wherein the event is one of predetermined, determined as a function of preset criteria, naturally occurring in the broadcast data, and generated as a function of the feedback data.

14. The system of claim 10, wherein the measurement data is based on one of a facial recognition, a motion recognition, and an audio recognition.

15. The system of claim 10, further comprising:
a plurality of provider devices receiving the broadcast data from the broadcasting device, the provider devices configured to forward the broadcast data to respective viewer devices.

16. The system of claim 10, wherein the HCICD captures the user feedback data at a location each of the users.

17. The system of claim 10, wherein the broadcasting device receives data indicating a grant of permission to capture the user feedback data from each of the users.

18. A non-transitory computer readable storage medium with an executable program stored thereon, wherein the program instructs a processor to perform operations, comprising:
detecting an event that occurs within broadcast data while viewing the broadcast data by a plurality of users;
when the event is detected, automatically capturing user feedback data with a human computer interaction (HCI) capturing device (HCICD) from each of the users, the user feedback data for each of the users being indicative of measurement data for each of the users from viewing the event;
aggregating the measurement data indicated by the user feedback data from each of the users;
generating a feature as a function of the aggregated measurement data;
including the feature in the broadcast data to generate an augmented broadcast data; and
transmitting the augmented broadcast data.

* * * * *